United States Patent
Langridge

(10) Patent No.: US 9,067,136 B2
(45) Date of Patent: Jun. 30, 2015

(54) PUSH PERSONALIZATION OF INTERFACE CONTROLS

(75) Inventor: Adam Jethro Langridge, Guildford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 414 days.

(21) Appl. No.: 13/045,323

(22) Filed: Mar. 10, 2011

(65) Prior Publication Data

US 2012/0229381 A1    Sep. 13, 2012

(51) Int. Cl.
| | |
|---|---|
| *G06F 3/033* | (2013.01) |
| *G09G 5/08* | (2006.01) |
| *A63F 13/219* | (2014.01) |
| *G06F 3/01* | (2006.01) |
| *G06F 3/042* | (2006.01) |

(Continued)

(52) U.S. Cl.
CPC ............... *A63F 13/04* (2013.01); *G06F 3/011* (2013.01); *G06F 3/017* (2013.01); *G06F 3/0425* (2013.01); *G06F 3/04815* (2013.01); *A63F 13/10* (2013.01); *A63F 2300/1093* (2013.01); *A63F 2300/6045* (2013.01); *A63F 2300/6607* (2013.01)

(58) Field of Classification Search
CPC ............. G06F 3/04886; G06F 3/0418; G06F 9/45558; G06F 2009/45579; G06F 3/041; G06F 3/044; G06F 9/455; G06F 13/00; G06F 3/016; G06F 3/048; G06F 3/0481; G06F 3/04883; G06F 9/44; G06F 11/1484

USPC ................. 345/156–184; 715/700, 856–862; 63/6–8, 30–31; 463/1–8, 30, 42, 463/50–69; 710/1–74
See application file for complete search history.

(56) References Cited

U.S. PATENT DOCUMENTS

| | | | |
|---|---|---|---|
| 4,627,620 | A | 12/1986 | Yang |
| 4,630,910 | A | 12/1986 | Ross et al. |
| 4,645,458 | A | 2/1987 | Williams |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Kenneth B Lee, Jr.
(74) *Attorney, Agent, or Firm* — Miia Sula; Judy Yee; Micky Minhas

(57) ABSTRACT

A computing system is configured to receive one or more depth images, from the depth camera, of a world space scene including a human target. The computing system translates a world space position of a hand of the human target to a screen space cursor position of the user interface using a virtual desktop transformation. The computing system also dynamically adjusts the virtual desktop transformation based on a history of button press actions executed by the human target.

20 Claims, 5 Drawing Sheets

(51) Int. Cl.
*G06F 3/0481* (2013.01)
*A63F 13/40* (2014.01)

(56) References Cited

U.S. PATENT DOCUMENTS

| | | | |
|---|---|---|---|
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,191,773 B1 * | 2/2001 | Maruno et al. ............... 345/156 |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |

(56) References Cited

U.S. PATENT DOCUMENTS

| | | | |
|---|---|---|---|
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 * | 3/2011 | Hildreth et al. ............... 345/156 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,487,871 | B2 * | 7/2013 | Langridge et al. ............ 345/157 |
| 2002/0075334 | A1 | 6/2002 | Yfantis |
| 2006/0033701 | A1 | 2/2006 | Wilson |
| 2008/0026838 | A1 | 1/2008 | Dunstan et al. |
| 2011/0141009 | A1 * | 6/2011 | Izumi ........................... 345/156 |

FOREIGN PATENT DOCUMENTS

| | | | |
|---|---|---|---|
| JP | 08044490 | A1 | 2/1996 |
| WO | 93/10708 | A1 | 6/1993 |
| WO | 97/17598 | A1 | 5/1997 |
| WO | 99/44698 | A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
Aggarwal et al., "Human Motion Analysis: A Review", IEEE Nonrigid and Articulated Motion Workshop, 1997, University of Texas at Austin, Austin, TX.
Shao et al., "An Open System Architecture for a Multimedia and Multimodal User Interface", Aug. 24, 1998, Japanese Society for Rehabilitation of Persons with Disabilities (JSRPD), Japan.
Kohler, "Special Topics of Gesture Recognition Applied in Intelligent Home Environments", In Proceedings of the Gesture Workshop, 1998, pp. 285-296, Germany.
Kohler, "Vision Based Remote Control in Intelligent Home Environments", University of Erlangen-Nuremberg/Germany, 1996, pp. 147-154, Germany.
Kohler, "Technical Details and Ergonomical Aspects of Gesture Recognition applied in Intelligent Home Environments", 1997, Germany.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, The Robotics Institute, Carnegie Mellon University, Pittsburgh, PA.
He, "Generation of Human Body Models", Apr. 2005, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collusion of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
Föhrenbach, Stephanie., "Hand Gesture Interaction for Large High-Resolution Displays Design and Evaluation", Retrieved at << http://hci.uni-konstanz.de/downloads/HandGestureInteraction_MA_Foehrenbach.pdf >>, Feb. 2009, pp. 138.
Zhai, et al., "Manual and Gaze Input Cascaded (MAGIC) Pointing", Retrieved at << http://www.almaden.ibm.com/u/zhai/papers/magic/magic.pdf >>, In Proceedings CHI: ACM Conference on Human Factors in Computing Systems, May 15-20, 1999, pp. 8.
Liao, et al., "Characterizing the Effects of Droplines on Target Acquisition Performance on a 3-D Perspective Display", Retrieved at << http://www.questia.com/googleScholar.qst?docId=5008899411 >>, 2004, pp. 2.
Fellner, et al., "Harnessing the human visual system for image based modeling: an interaction system", Retrieved at << http://www.scss.tcd.ie/~ymorvan/paper1012.pdf >>, 2006, pp. 4.
Kumar, et al., "Black Pearl: An Alternative for Mouse and Keyboard", Retrieved at << http://www.icgst.com/gvip/volume8/issue3/P1150824001.pdf >>, ICGST International Journal on Graphics, Vision and Image Processing, GVIP, vol. 8, No. 3, Oct. 2008, pp. 1-6.
Wurnig, Hermann., "Design of a Collaborative Multi User Desktop System for Augmented Reality", Retrieved at <<http://www.cescg.org/CESCG98/HWurnig/desktopdesign.html >>, Retrieved Date: Dec. 23, 2010, pp. 10.
"Vtwm", Retrieved at << http://www.vtwm.org/vtwm-manpage.html >>, Retrieved Date: Dec. 24, 2010, pp. 24.

* cited by examiner

US 9,067,136 B2

PUSH PERSONALIZATION OF INTERFACE CONTROLS

BACKGROUND

Computer technology has advanced to enable humans to interact with computers in various ways. One such interaction may occur between humans and gaming systems. For example, some gaming systems may respond to a player's physical movement. However, due to wide variation in each human's natural way of moving (e.g., way of pushing buttons), the gaming system's interpretation of a player's physical movement may be error-prone, rendering the gaming experience unsatisfactory.

SUMMARY

Push personalization of interface controls is disclosed. One example embodiment includes receiving one or more depth images of a world space scene including a human target and translating a world space position of a hand of the human target to a screen space cursor position of the user interface using a virtual desktop transformation. The virtual desktop transformation may be dynamically adjusted by a history of button press actions executed by the human target.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
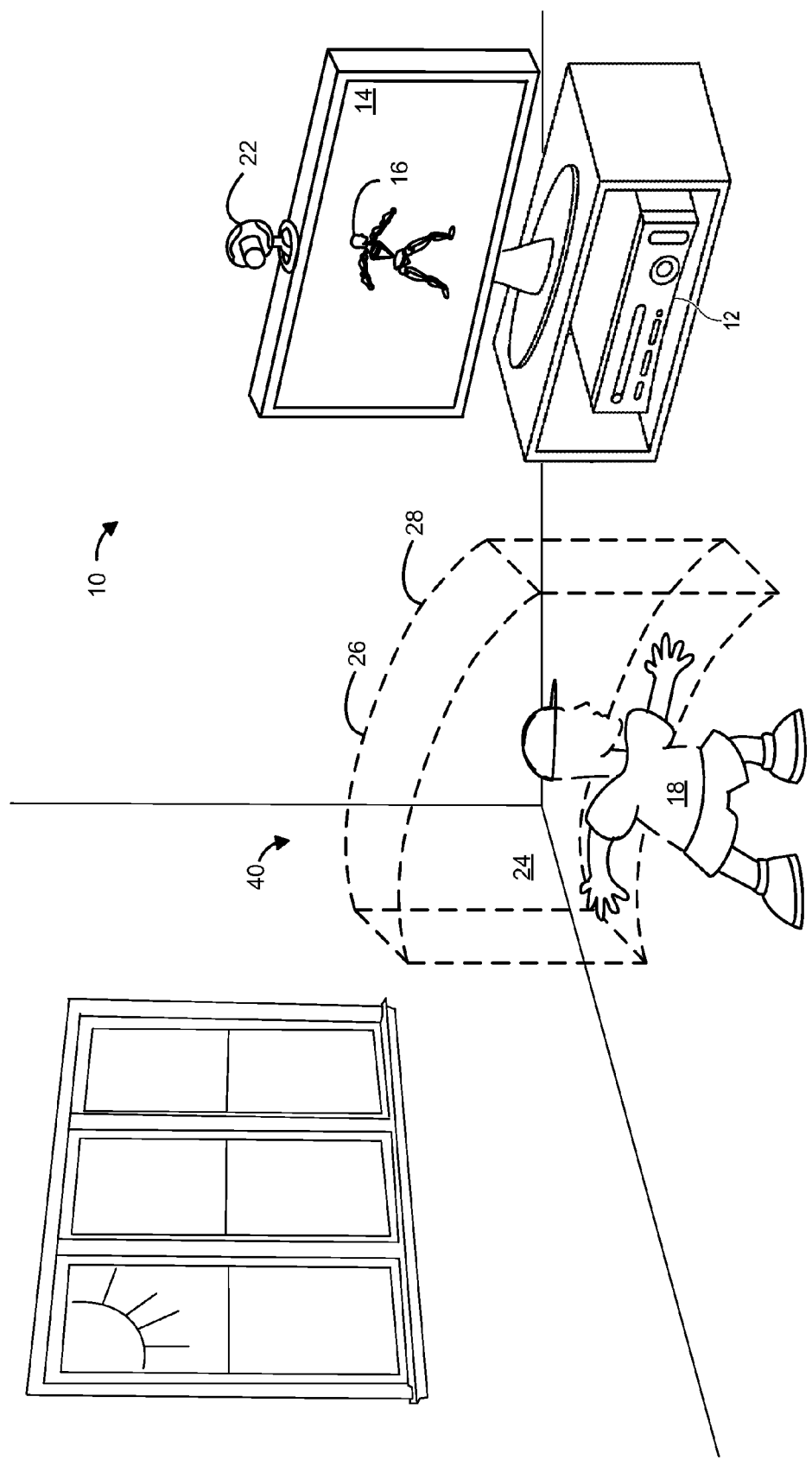
FIG. 1 shows a depth-image analysis system viewing an observed scene in accordance with an embodiment of the present disclosure.

FIG. 1 shows a non-limiting example of a depth-image analysis system 10. In particular, FIG. 1 shows a gaming system 12 that may be used to play a variety of different games, play one or more different media types, and/or control or manipulate non-game applications and/or operating systems. FIG. 1 also shows a display device 14 such as a television or a computer monitor, which may be used to present game visuals to game players. As one example, display device 14 may be used to visually present a virtual avatar 16 that human target 18 controls with his movements. The depth-image analysis system 10 may include a capture device, such as a depth camera 22 that visually monitors or tracks human target 18 within an observed scene 24. Depth camera 22 is discussed in greater detail with respect to FIG. 5. Depth camera 22 may be connected to gaming system 12 via a peripheral input, such as a Universal Serial Bus.

Human target 18 is shown here as a game player within observed scene 24. Human target 18 is tracked by depth camera 22 so that the movements of human target 18 in world space 40 may be interpreted by gaming system 12 as controls that can be used to affect the game being executed by gaming system 12. In other words, human target 18 may use his or her movements to control the game. The movements of human target 18 may be interpreted as virtually any type of game control. Some movements of human target 18 may be interpreted as controls that serve purposes other than controlling virtual avatar 16. As a nonlimiting example, movements of human target 18 may be interpreted as user interface controls, such as controls for pressing a virtual button of a virtual user interface displayed by display device 14. Display device 14 may be connected to gaming system 12 via a display output, such as a High-Definition Multimedia Interface.

The movements of human target 18 may be tracked, over time, in a virtual interface space 26 that moves as the human target moves about in world space 40. A position and orientation of virtual interface space 26 may be based on a position and orientation of the human target. As a non-limiting example, the position and orientation of virtual interface space 26 may be based on a relative position of a head of the human target such that a position and orientation of the virtual interface space 26 is adjusted as a position of the head of the human target changes. However, in alternate embodiments, the position and orientation of the virtual interface space 26 may vary with the relative position of one or more alternate body parts of the human target, such as the chest or shoulders. Thus, as the human target moves about in world space (e.g., steps forward, steps backward, turns to the left, turns to the right), the virtual interface space 26 is correspondingly realigned relative to the human target.

Virtual interface space 26 may have a virtual shape 28 (depicted herein by dashed lines). As such, virtual interface space 26 may be configured as virtually any shape. As a non-limiting example, virtual interface space 26 is depicted as a curved virtual interface space in FIG. 1. In an alternate example, virtual interface space 26 may be configured as two curved surfaces in a fixed position relative to the human target (e.g., centered around a portion of the human target such as the head or the shoulders). As elaborated below, a shape of virtual interface space 26 may be adjusted based on a history of button press actions executed by the human target 18. For example, a curvature of curved virtual interface space may be dynamically adjusted based on the history of button press actions. A position and orientation of virtual interface space 26 may also be further adjusted based on the history of button press actions. By calibrating virtual interface space 26 for a user based on the human target's natural way of moving, gaming system 12 may be able to better interpret the movements of the human target within virtual interface space 26.

Depth camera 22 may also be used to interpret target movements as operating system and/or application controls that are outside the realm of gaming. Virtually any controllable aspect of an operating system and/or application may be controlled by movements of a human target 18. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure.

The methods and processes described herein may be tied to a variety of different types of computing systems. FIG. 1 shows a non-limiting example in the form of gaming system 12, display device 14, and depth camera 22. In general, a depth-image analysis system may include a computing system 160, shown in simplified form in FIG. 5, which will be discussed in greater detail below.

Figure 2:
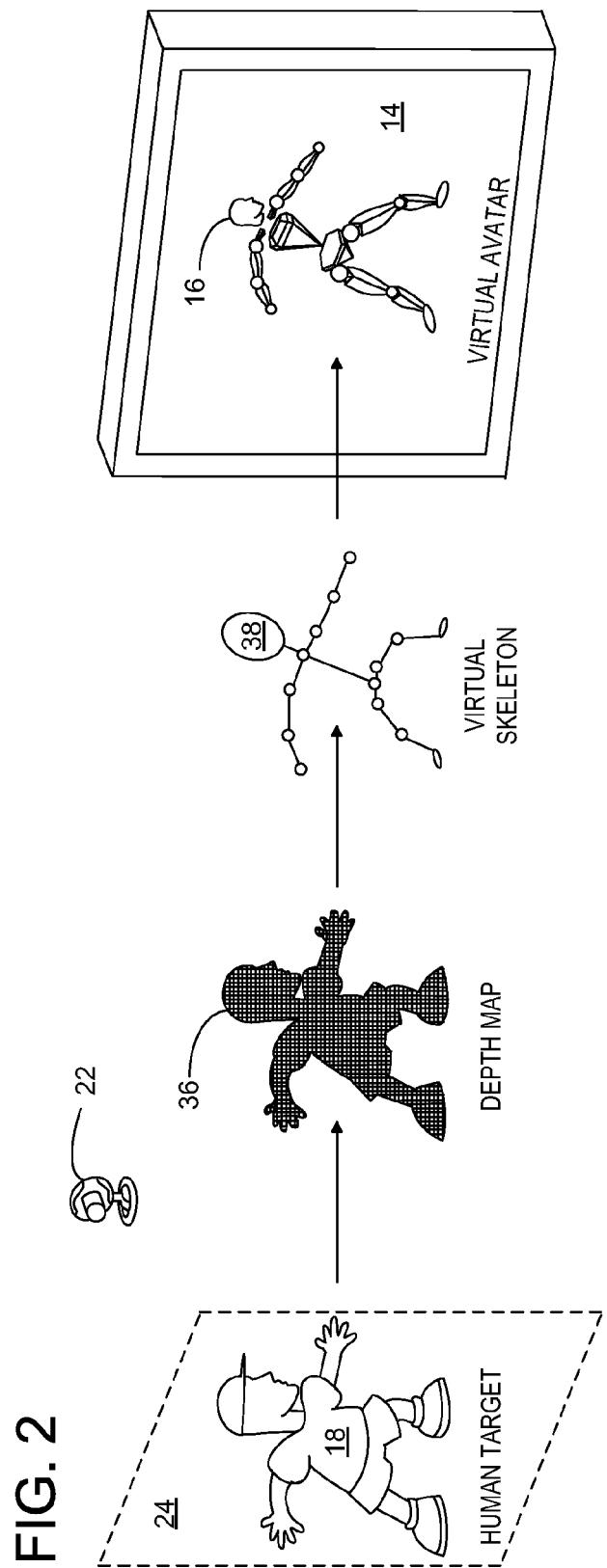
FIG. 2 schematically shows a human target in an observed scene being modeled with example skeletal data.

FIG. 2 shows a simplified processing pipeline in which human target 18 in an observed scene 24 is modeled as a virtual skeleton 38 that can be used to draw a virtual avatar 16 on display device 14 and/or serve as a control input for controlling other aspects of a game, application, and/or operating system. It will be appreciated that a processing pipeline may include additional steps and/or alternative steps to those depicted in FIG. 2 without departing from the scope of this disclosure.

As shown in FIG. 2, human target 18 and the rest of observed scene 24 may be imaged by a capture device such as depth camera 22. The depth camera may determine, for each pixel, the depth of a surface in the observed scene relative to the depth camera. Virtually any depth finding technology may be used without departing from the scope of this disclosure. Example depth finding technologies are discussed in more detail with reference to FIG. 5.

The depth information determined for each pixel may be used to generate a depth map 36. Such a depth map may take the form of virtually any suitable data structure, including but not limited to a matrix that includes a depth value for each pixel of the observed scene. In FIG. 2, depth map 36 is schematically illustrated as a pixelated grid of the silhouette of human target 18. This illustration is simplified for ease of understanding. It is to be understood that a depth map generally includes depth information for all pixels, not just pixels that image the human target 18, and that the perspective of depth camera 22 would not result in the silhouette depicted in FIG. 2.

Virtual skeleton 38 may be derived from depth map 36 to provide a machine readable representation of human target 18. In other words, virtual skeleton 38 is derived from depth map 36 to model human target 18. The virtual skeleton 38 may be derived from the depth map in any suitable manner. In some embodiments, one or more skeletal fitting algorithms may be applied to the depth map. The present disclosure is compatible with virtually any skeletal modeling techniques.

The virtual skeleton 38 may include a plurality of joints, each joint corresponding to a portion of the human target. In FIG. 2, virtual skeleton 38 is illustrated as a fifteen-joint stick figure. This illustration is simplified for ease of understanding. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As shown in FIG. 2, a virtual avatar 16 may be rendered on display device 14 as a visual representation of virtual skeleton 38. Because virtual skeleton 38 models human target 18, and the rendering of the virtual avatar 16 is based on the virtual skeleton 38, the virtual avatar 16 serves as a viewable digital representation of the human target 18. As such, movement of virtual avatar 16 on display device 14 reflects the movements of human target 18.

In some embodiments, only portions of a virtual avatar will be presented on display device 14. As one non-limiting example, display device 14 may present a first person perspective to human target 18 and may therefore present the portions of the virtual avatar that could be viewed through the virtual eyes of the virtual avatar (e.g., outstretched hands holding a steering wheel, outstretched arms holding a rifle, outstretched hands grabbing a virtual object in a three-dimensional virtual world, etc.).

While virtual avatar 16 is used as an example aspect of a game that may be controlled by the movements of a human target via the skeletal modeling of a depth map, this is not intended to be limiting. A human target may be modeled with a virtual skeleton, and the virtual skeleton can be used to control aspects of a game or other application other than a virtual avatar. For example, the movement of a human target can control a game or other application even if a virtual avatar is not rendered to the display device.

Figure 3:
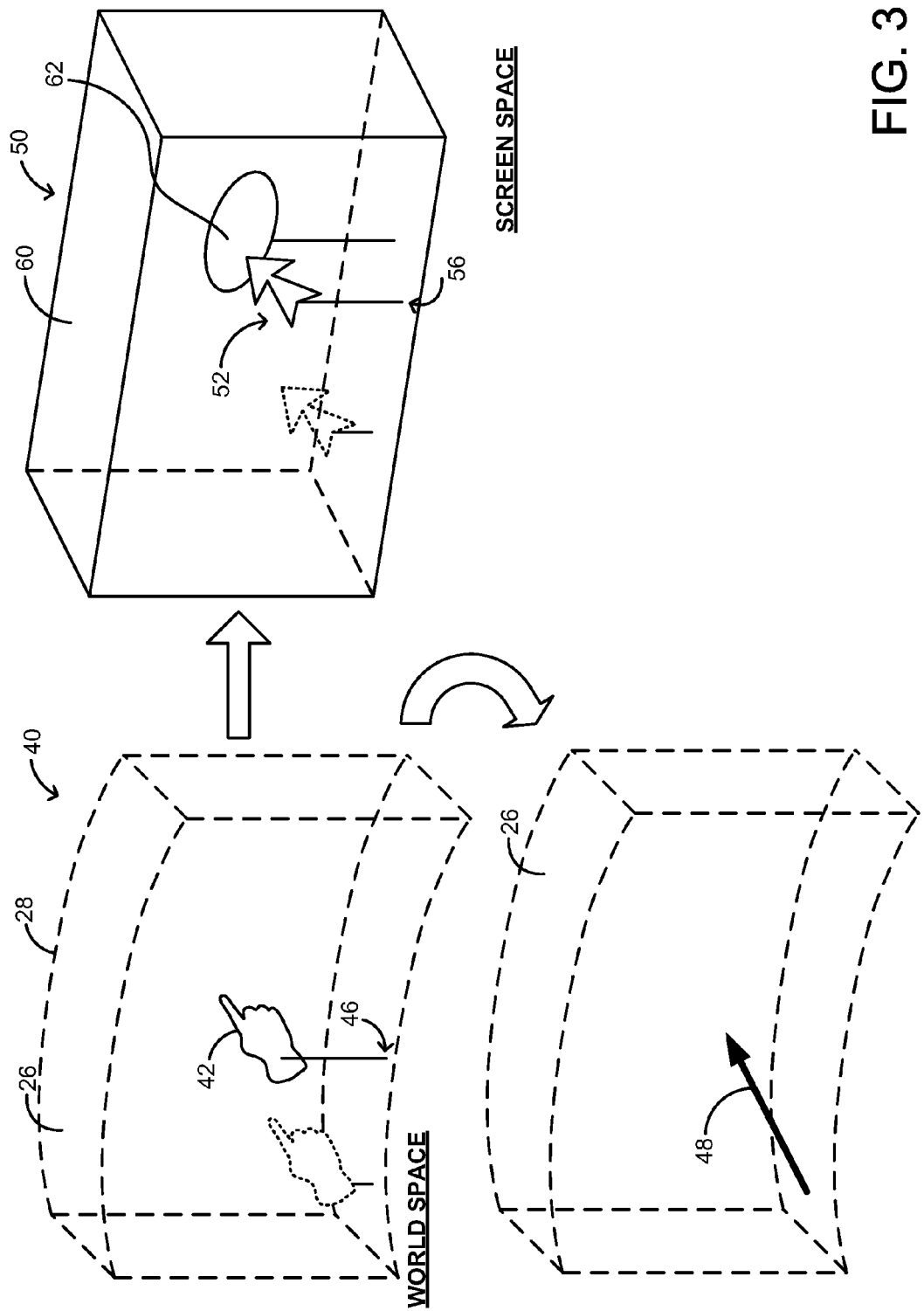
FIG. 3 shows an example of a push vector related to a hand movement in world space that causes a push movement of a cursor in screen space.

Instead of displaying an avatar of the human target, a cursor may be displayed. FIG. 3 illustrates an example in which a position of a hand 42 of the human target in world space 40 is used to control a position of a cursor 52 in a screen space 50. A movement of the hand 42 of the human target may be tracked within virtual interface space 26 based on one or more depth images received from a depth camera.

The tracked movements of hand 42 are then translated to corresponding movements of a cursor 52 in screen space 50. That is, a world space position 46 of hand 42 may be translated to a screen space cursor position 56 of a user interface 60 displayed by a computing system. In the depicted example, a movement of the hand 42 from an initial hand position (depicted as a hand in dotted lines) to a final hand position (depicted as a hand in solid lines) causes a corresponding movement of the cursor 52 from an initial cursor position (depicted as a cursor in dotted lines) to a final cursor position (depicted as a cursor in solid lines).

The computing system may translate the world space position 46 of the hand 42 in virtual interface space 26 to a screen space cursor position 56 of cursor 52 on a user interface 60 using a virtual desktop transformation. The virtual desktop transformation may include, for example, various transformation matrices and algorithms for transforming the position and movement of the hand to a corresponding position and movement of the cursor. In the depicted example, where the virtual interface space 26 has a curved virtual shape 28, the computing system translates the world space position of the hand in the curved virtual interface space to a screen space cursor position in a user interface of an uncurved screen space using the virtual desktop transformation.

User interface 60 may include one or more control features that may be actuated or selected by predefined hand movements. These may include, for example, knobs, dials, buttons, menus, etc. In the depicted example, the user interface 60 includes a button 62 that may be actuated by a button press action. The button press action may correspond to a specified hand movement that occurs while the cursor 52 is overlapping the button 62 in the screen space 50. In the present example, the depicted movement of hand 42 from the initial position to a final position may be defined as a button press action wherein button 62 is actuated due to a corresponding movement of the cursor 52 from an initial position to a final position while overlapping the button 62.

At any given time, the hand's position within virtual interface space 26 may be defined by x-y-z coordinates, wherein the x-coordinate indicates the lateral position of the hand, the y-coordinate indicates the vertical position of the hand, and the z-coordinate indicates the depth of the hand in the virtual interface space 26. Likewise, at any given time, the cursor's position may also be defined by x-y-z coordinates, wherein the x-coordinate indicates the lateral position of the cursor, the y-coordinate indicates the vertical position of the cursor, and the z-coordinate indicates the depth of the cursor in the user interface 60.

A hand movement corresponding to a button press action is concluded if predefined button press criteria are met. One example of a button press criterion includes a movement of the hand in world space that changes the cursor position by at least a depth threshold along the z-axis, regardless of the initial z-axis position of the cursor 52. In other words, a hand movement in world space that "pushes" the cursor by at least the depth threshold is considered a button press action that actuates button 62. Another example of a button press criterion includes a movement of the hand in world space that changes the cursor velocity by a threshold amount along the z-axis. In still another example, a normalized z-axis component of the cursor velocity may be compared to normalized x and y-axis components to determine if a button press action has occurred. In other words, a hand movement in world space that pushes into the virtual interface space faster that it moves across the virtual interface space is considered a button press action that actuates button 62. Still other button press criteria may be possible. In each case, the button press action is defined based on a start of the push, the continued pushing action (over a duration or distance), and the end of the push.

One or more button press actions executed by the human target may be stored in a history of button press actions wherein each button press action is identified based on a specified change in the screen space cursor position responsive to a movement of the hand in world space. Each button press action may be further represented by a press vector. In the depicted example, the movement of hand 42 that corresponds to a button press action is represented by press vector 46. Thus, a plurality of press vectors may be compiled in the history of button press actions, each press vector corresponding to a button press action.

As such, different human targets have different styles of performing hand movements that correspond to a button pressing action. For example, the different hand movements may differ in their speed and/or angle of approach. As an example, some users may tend to use long, slow pushes to actuate a button on the user interface while other users may use short, sharp "taps" to actuate the button. Thus, if pressing actions are not calibrated for each user, there can be significant "slippage" wherein the cursor moves away from the area of the screen that the user intended to select.

To reduce such "slippage", a computing system may dynamically adjust the virtual desktop transformation based on the history of button press actions executed by the human target. This may include dynamically adjusting the virtual shape 28 of the virtual interface space 26 based on the history of button press actions. In the present example, wherein the virtual interface space is curved, a curvature of the curved virtual interface space may have a virtual focal point that is derived from the history of button press actions executed by the human target.

The one or more button press actions in the history of button press actions may include implicit button press actions and/or explicit button press actions. The explicit button press actions may include a number of button press actions executed by the human target (that is, user) during a calibration session. In one example, the calibration session may be performed when the user initiates operation of a computing system, for example, by turning on a gaming system. During the calibration session, the user may be asked to press-activate different areas of the screen space. For example, the user may be asked to actuate various buttons positioned at different areas of the user interface. Hand movements of the human target corresponding to each button press action may be stored as explicit button press actions and used to adjust the virtual shape of the virtual interface space. In one example, the calibration session may precede a gaming session such that the virtual interface is dynamically adjusted and tuned to the pushing style of the user for the gaming session.

The implicit button press actions may include a number of button press actions executed by the user over a defined duration (e.g., during a given gaming session). Herein, button press actions may be adaptively learned based on continued interactions of the human target with the computing system, and the virtual interface space may be accordingly dynamically adjusted.

Figure 4:
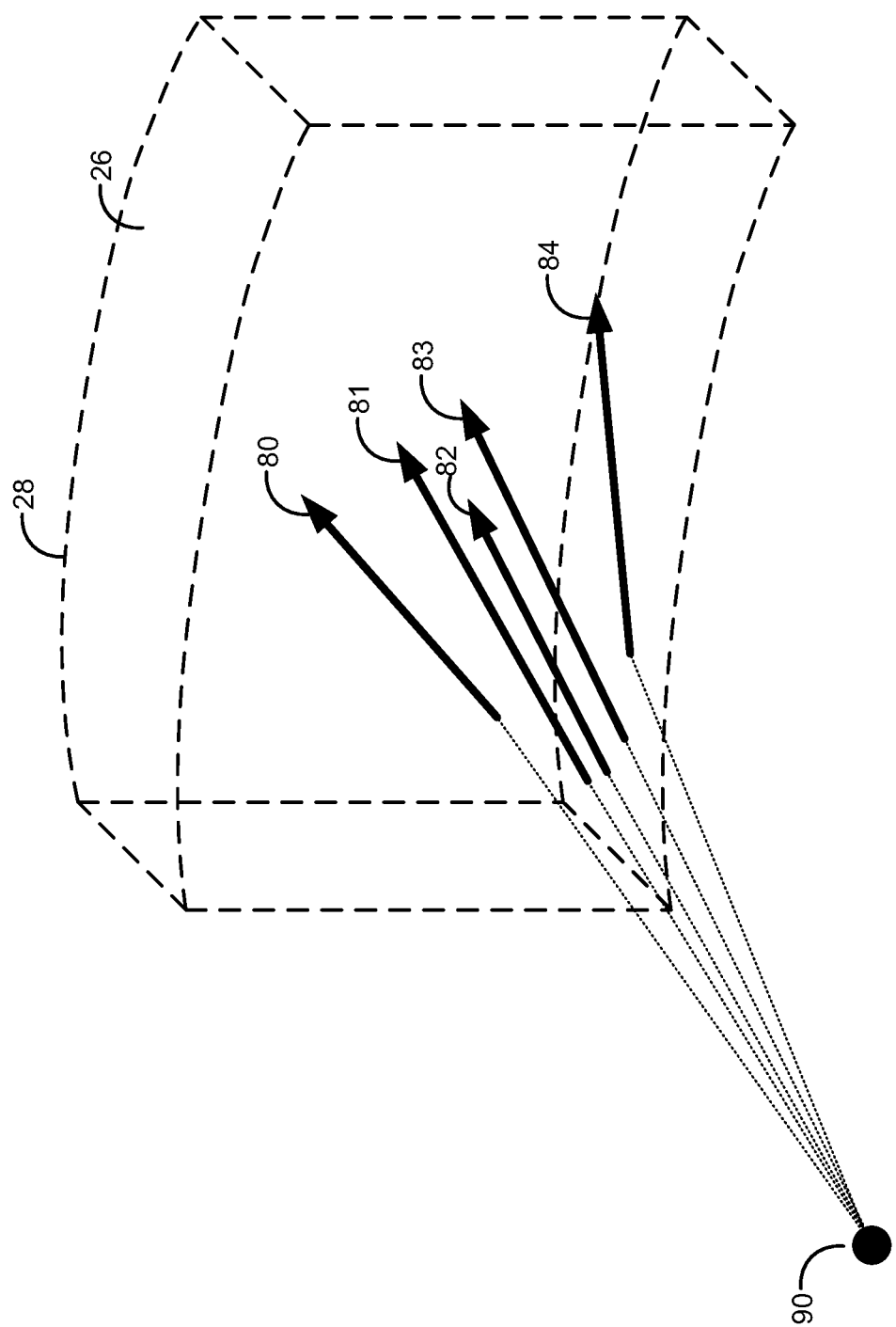
FIG. 4 shows an example of a plurality of press vectors corresponding to a plurality of button press actions executed by a human target.

FIG. 4 shows an example of a plurality of press vectors 80-84. Each press vector 80-84 corresponds to a button press action in a history of button press actions. As such, each press vector may be plotted based on a movement of a hand of the human target (relative to a world position of the head of the human target) in virtual interface space 26.

A computing system may derive a button press origin 90 from the plurality of press vectors 80-84. To do this, the press vectors may be grouped into one or more clusters. Each cluster may include one or more press vectors selected based on the position of each press vector in the virtual interface space 26. For example, the virtual interface space 26 may include a matrix of grid segments and press vectors may be selected for each cluster based on the position of each press vector in the matrix of grid segments.

Next, for each of the one or more clusters, a mean press vector may be calculated. While calculating the mean press vector, any press vectors that are significantly different (for example, outlying press vectors that differ by more than a threshold magnitude, direction, and/or distance between origin positions) may be dismissed. A button press origin 90 is then determined based on the mean press vector of each of the one or more clusters. In one example, the button press origin 90 is the mean of the centre point of the line of shortest distance between all the mean press vectors.

As a non-limiting example, the virtual interface space may include a matrix of nine grid segments laid out across a three-by-three grid. One or more press vectors in the history of button press actions may be included in one of the nine clusters, corresponding to the nine grid segments, based on their position in the three-by-three grid. Nine mean press vectors are then calculated for the nine clusters. The nine mean press vectors are then extended back towards the user (that is, away from the depth camera) and the point of most likely intersection between all of them is determined to be the button press origin.

A virtual shape 28 of the virtual interface space 26 is then adjusted based on the button press origin 90. In one example, a curvature of a curved virtual interface may have a virtual focal point derived from the button press origin. In some embodiments, the virtual focal point and the button press origin may overlap. Alternatively, the curvature of the curved virtual interface space may be based on a position of the virtual focal point in relation to a position of the human target. For example, the virtual focal point may be derived from a position of the button press origin in relation to a position of a head of the human target.

A virtual position and orientation of the virtual interface space may also be further adjusted based on the position of the button press origin. For example, the virtual position and orientation may be adjusted based on the position of the button press origin in relation to a position of the head of the human target.

The button press actions, and the virtual interface space adjustment, may be affected by which hand (or other body part) the human target uses to perform the button press actions, and the handedness of the user (for example, whether the user is left-handed or right-handed). The handedness of the user may affect, for example, a tilt or orientation with which the hand of the human target approaches or presses a button on the user interface.

To reduce "slippage" caused by differences in right and left handedness, the computing system may derive a left hand virtual focal point of the virtual interface space based on press vectors generated for each left hand button press action in the history of button press actions executed by the human target. Likewise, a right hand virtual focal point of the virtual interface space may be derived based on press vectors generated for each right hand button press action in the history of button press actions executed by the human target. A curved virtual interface space may be dynamically adjusted based on the left hand virtual focal point responsive to a movement of the left hand of the human target in world space. Similarly, the virtual interface space may be dynamically adjusted based on the right hand virtual focal point responsive to a movement of the right hand of the human target in world space.

In this way, by adjusting a virtual desktop transformation based on a history of button press actions executed by a human target, a shape of a virtual interface space can be changed to better reflect the pushing style of the user. By refining the virtual interface space to better match a user's pushing style, unwanted slipping and accidental push selections are decreased, enhancing the user's experience.

In some embodiments, the above described methods and processes may be tied to a computing system including one or more computers. In particular, the methods and processes described herein may be implemented as a computer application, computer service, computer API, computer library, and/or other computer program product.

Figure 5:
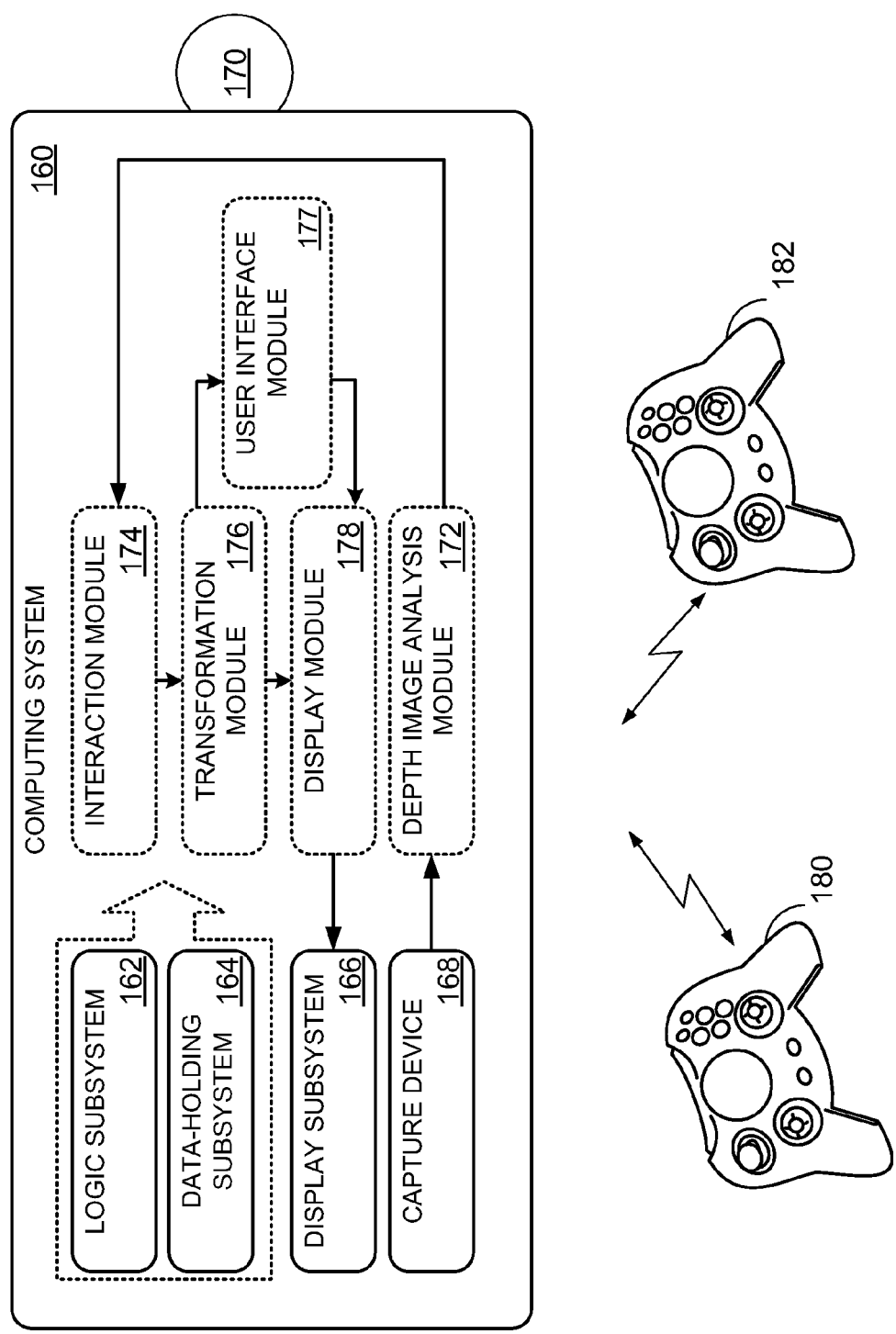
FIG. 5 shows a computing system in accordance with an embodiment of the present disclosure.

FIG. 5 schematically shows a non-limiting computing system 160 that may perform one or more of the above described methods and processes. Computing system 160 is shown in simplified form. It is to be understood that virtually any computer architecture may be used without departing from the scope of this disclosure. In different embodiments, computing system 160 may take the form of a mainframe computer, server computer, desktop computer, laptop computer, tablet computer, home entertainment computer, network computing device, mobile computing device, mobile communication device, gaming device, etc.

Computing system 160 may include a logic subsystem 162, a data-holding subsystem 164, a display subsystem 166, and/or a capture device 168. The computing system may optionally include components not shown in FIG. 5, and/or some components shown in FIG. 5 may be peripheral components that are not integrated into the computing system.

Logic subsystem 162 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 164 may include one or more physical, non-transitory, devices configured to hold data and/or instructions executable by the logic subsystem to implement the herein described methods and processes. When such methods and processes are implemented, the state of data-holding subsystem 164 may be transformed (e.g., to hold different data).

Data-holding subsystem 164 may include removable media and/or built-in devices. Data-holding subsystem 164 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 164 may include devices with one or more of the following characteristics: volatile, nonvolatile, dynamic, static, read/write, read-only, random access, sequential access, location addressable, file addressable, and content addressable. In some embodiments, logic subsystem 162 and data-holding subsystem 164 may be integrated into one or more common devices, such as an application specific integrated circuit or a system on a chip.

FIG. 5 also shows an aspect of the data-holding subsystem in the form of removable computer-readable storage media 170, which may be used to store and/or transfer data and/or instructions executable to implement the herein described methods and processes. Removable computer-readable storage media 170 may take the form of CDs, DVDs, HD-DVDs, Blu-Ray Discs, EEPROMs, and/or floppy disks, among others.

It is to be appreciated that data-holding subsystem 164 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The term "module" may be used to describe an aspect of computing system 160 that is implemented to perform one or more particular functions. In some cases, such a module may be instantiated via logic subsystem 162 executing instructions held by data-holding subsystem 164. It is to be understood that different modules and/or engines may be instantiated from the same application, code block, object, routine, and/or function. Likewise, the same module and/or engine may be instantiated by different applications, code blocks, objects, routines, and/or functions in some cases.

Computing system 160 includes a depth image analysis module 172 configured to track a world-space pose of a human in a fixed, world-space coordinate system, as described herein. The term "pose" refers to the human's position, orientation, body arrangement, etc. Computing system 160 includes an interaction module 174 configured to establish a virtual interaction zone with a moveable, interface-space coordinate system that tracks the human and moves relative to the fixed, world-space coordinate system, as described herein. Computing system 160 includes a transformation module 176 configured to transform a position defined in the fixed, world-space coordinate system to a position defined in the moveable, interface-space coordinate system as described herein. Computing system 160 also includes a display module 178 configured to output a display signal for displaying an interface element at a desktop-space coordinate corresponding to the position defined in the moveable, interface-space coordinate system.

Computing system 160 includes a user interface module 177 configured to translate cursor movements in a user interface to actions involving the interface elements. As a nonlimiting example, user interface module 177 may analyze cursor movements relative to buttons of the user interface to determine when such buttons are to be actuated.

Display subsystem 166 may be used to present a visual representation of data held by data-holding subsystem 164. As the herein described methods and processes change the data held by the data-holding subsystem, and thus transform the state of the data-holding subsystem, the state of display subsystem 166 may likewise be transformed to visually represent changes in the underlying data. As a nonlimiting example, the target recognition, tracking, and analysis described herein may be reflected via display subsystem 166 in the form of interface elements (e.g., cursors) that change position in a virtual desktop responsive to the movements of a user in physical space. Display subsystem 166 may include one or more display devices utilizing virtually any type of technology. Such display devices may be combined with logic subsystem 162 and/or data-holding subsystem 164 in a shared enclosure, or such display devices may be peripheral display devices, as shown in FIG. 1.

Computing system 160 further includes a capture device 168 configured to obtain depth images of one or more targets. Capture device 168 may be configured to capture video with depth information via any suitable technique (e.g., time-of-flight, structured light, stereo image, etc.). As such, capture device 168 may include a depth camera (such as depth camera 22 of FIG. 1), a video camera, stereo cameras, and/or other suitable capture devices.

For example, in time-of-flight analysis, the capture device 168 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time via a technique such as shuttered light pulse imaging.

In another example, structured light analysis may be utilized by capture device 168 to capture depth information. In such an analysis, patterned light (i.e., light displayed as a known pattern such as a grid pattern or a stripe pattern) may be projected onto the target. On the surface of the target, the pattern may become deformed, and this deformation of the pattern may be studied to determine a physical distance from the capture device to a particular location on the target.

In another example, the capture device may include two or more physically separated cameras that view a target from different angles, to obtain visual stereo data. In such cases, the visual stereo data may be resolved to generate a depth image.

In other embodiments, capture device 168 may utilize other technologies to measure and/or calculate depth values. Additionally, capture device 168 may organize the calculated depth information into "Z layers," i.e., layers perpendicular to a Z axis extending from the depth camera along its line of sight to the viewer.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 160 may optionally include one or more input devices, such as controller 180 and controller 182. Input devices may be used to control operation of the computing system. In the context of a game, input devices, such as controller 180 and/or controller 182 can be used to control aspects of a game not controlled via the target recognition, tracking, and analysis methods and procedures described herein. In some embodiments, input devices such as controller 180 and/or controller 182 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

The invention claimed is:

1. A computing system, comprising:
a peripheral input configured to receive depth images from a depth camera;
a display output configured to output a user interface to a display device;
a logic subsystem operatively connectable to the depth camera via the peripheral input and to the display device via the display output;
a data holding subsystem holding instructions executable by the logic subsystem to:
receive from the depth camera one or more depth images of a world space scene including a human target;
translate a world space position of a hand of the human target in a curved virtual interface space having a curved virtual shape to an uncurved screen space cursor position of the user interface using a virtual desktop transformation, the virtual desktop transformation and the curved virtual shape of the curved virtual interface space being dynamically adjusted based on a history of button press actions executed by the human target.

2. The computing system of claim 1, wherein each button press action in the history of button press actions is identified based on a change in the screen space cursor position responsive to a movement of the hand in world space.

3. The computing system of claim 1, wherein the history of button press actions includes a plurality of press vectors, each press vector corresponding to a button press action in the history of button press actions.

4. The computing system of claim 3, wherein the data holding subsystem holds instructions executable by the logic subsystem to derive a button press origin from the plurality of press vectors.

5. The computing system of claim 4, wherein the virtual desktop transformation translates the world space position of the hand in the virtual interface space.

6. The computing system of claim 5, wherein the virtual shape of the virtual interface space is dynamically adjusted based on the button press origin.

7. The computing system of claim 6, wherein the virtual interface space has a virtual position and orientation based on a position of the human target.

8. The computing system of claim 7, wherein the virtual position and orientation of the virtual interface space is dynamically adjusted based on a position of the button press origin in relation to a position of a head of the human target.

9. A computing system, comprising:
a peripheral input configured to receive depth images from a depth camera;
a display output configured to output a user interface to a display device;
a logic subsystem operatively connectable to the depth camera via the peripheral input and to the display device via the display output;
a data holding subsystem holding instructions executable by the logic subsystem to:
receive from the depth camera one or more depth images of a world space scene including a human target;
translate a world space position of a hand of the human target in a curved virtual interface space having a virtual shape to a screen space cursor position in a user interface of an uncurved screen space using a virtual desktop transformation, the virtual desktop transformation and the virtual shape of the curved virtual interface space being dynamically adjusted by a history of button press actions executed by the human target.

10. The computing system of claim 9, wherein a curvature of the curved virtual interface space has a virtual focal point derived from the history of button press actions executed by the human target.

11. The computing system of claim 10, wherein the history of button press actions includes one or more button press actions, each button press action identified based on a change in the screen space cursor position responsive to a movement of the hand in world space, each button press action further represented by a press vector.

12. The computing system of claim 11, wherein the history of button press actions further includes a button press origin derived from the press vector of each button press action.

13. The computing system of claim 12, wherein the virtual focal point is derived from the button press origin.

14. The computing system of claim 13, wherein the virtual interface space has a virtual position and orientation derived from a position of the button press origin in relation to a position of a head of the human target.

15. A computing system, comprising:
a peripheral input configured to receive depth images from a depth camera;
a display output configured to output a user interface to a display device;
a logic subsystem operatively connectable to the depth camera via the peripheral input and to the display device via the display output;
a data holding subsystem holding instructions executable by the logic subsystem to:
receive from the depth camera one or more depth images of a world space scene including a human target;
translate a world space position of a hand of the human target in a curved virtual interface space to a screen space cursor position of a user interface in an uncurved screen space using a virtual desktop transformation, the curved virtual interface including a matrix of grid segments;
compile press vectors generated for each button press action in a history of button press actions executed by the human target, each button press action identified based on a change in the screen space cursor position responsive to a movement of the hand in world space; and
dynamically adjust the curved virtual interface space based on a virtual focal point, the virtual focal point derived from the press vectors based on a position of the press vectors within the matrix of grid segments.

16. The computing system of claim 15, wherein dynamically adjusting the curved virtual interface space includes adjusting a curvature of the curved virtual interface space based on a position of the virtual focal point in relation to a position of the human target.

17. The computing system of claim 16, wherein the data holding subsystem holds instructions executable by the logic subsystem to:
group the press vectors into one or more clusters, each of the one or more clusters including one or more press vectors selected based on the position of each press vector in the matrix of grid segments;
calculate a mean press vector for each of the one or more clusters;
determine a button press origin based on the mean press vector of each of the one or more clusters; and
derive the virtual focal point of the curved virtual interface space based on the button press origin.

18. The computing system of claim 17, wherein the data holding subsystem holds instructions executable by the logic subsystem to:
derive a left hand virtual focal point based on press vectors generated for each left hand button press action in the history of button press actions executed by the human target, and derive a right hand virtual focal point based on press vectors generated for each right hand button press action in the history of button press actions executed by the human target.

19. The computing system of claim 18, wherein the data holding subsystem holds instructions executable by the logic subsystem to:
dynamically adjust the curved virtual interface space based on the left hand virtual focal point responsive to a movement of the left hand of the human target in world space; and dynamically adjust the curved virtual interface space based on the right hand virtual focal point responsive to a movement of the right hand of the human target in world space.

20. The computing system of claim 15, wherein the history of button press actions includes implicit button press actions and/or explicit button press actions.

\* \* \* \* \*